(12) United States Patent
Popp

(10) Patent No.: US 12,302,026 B2
(45) Date of Patent: May 13, 2025

(54) BACKGROUND DISPLAY DEVICE

(71) Applicant: Arnold & Richter Cine Technik GmbH & Co. Betriebs KG, Munich (DE)

(72) Inventor: Hermann Popp, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 0 days.

(21) Appl. No.: 17/963,335

(22) Filed: Oct. 11, 2022

(65) Prior Publication Data
US 2023/0110191 A1 Apr. 13, 2023

(30) Foreign Application Priority Data
Oct. 11, 2021 (DE) .......................... 102021126313.1

(51) Int. Cl.
*H04N 5/222* (2006.01)
*G06F 3/147* (2006.01)
*H04N 9/30* (2006.01)

(52) U.S. Cl.
CPC ........... *H04N 5/2224* (2013.01); *G06F 3/147* (2013.01); *H04N 9/30* (2013.01)

(58) Field of Classification Search
CPC ......... H04N 5/2224; H04N 9/30; G06F 3/147
See application file for complete search history.

(56) References Cited

U.S. PATENT DOCUMENTS

| | | | |
|---|---|---|---|
| 10,390,736 B1* | 8/2019 | Berme | G09G 5/14 |
| 2008/0084508 A1 | 4/2008 | Cole et al. | |
| 2015/0348326 A1 | 12/2015 | Sanders et al. | |
| 2017/0330596 A1* | 11/2017 | Segal | H04N 5/2222 |
| 2018/0176506 A1* | 6/2018 | McNelley | H04N 7/142 |
| 2020/0145644 A1 | 5/2020 | Cordes et al. | |
| 2021/0146265 A1* | 5/2021 | Lamm | G06F 3/04815 |

FOREIGN PATENT DOCUMENTS

WO 2020097212 A1 5/2020

OTHER PUBLICATIONS

European Patent Office Communication issued in Application No. 22200056.4, dated Feb. 23, 2023.

* cited by examiner

*Primary Examiner* — Mishawn N. Hunter
(74) *Attorney, Agent, or Firm* — Amster, Rothstein & Ebenstein LLP

(57) ABSTRACT

A background display device for a virtual image recording studio is configured to display, behind a real subject, a representation of a virtual background for a recording by an associated camera and has at least one panel, which has a plurality of actively illuminating picture elements in a two-dimensional arrangement, and a control circuit. The control circuit is configured to control the picture elements to alternately display at least a part of the representation of the virtual background and a reference image that does not represent the virtual background, wherein the control circuit has a reference image memory in which the reference image can be stored.

23 Claims, 6 Drawing Sheets

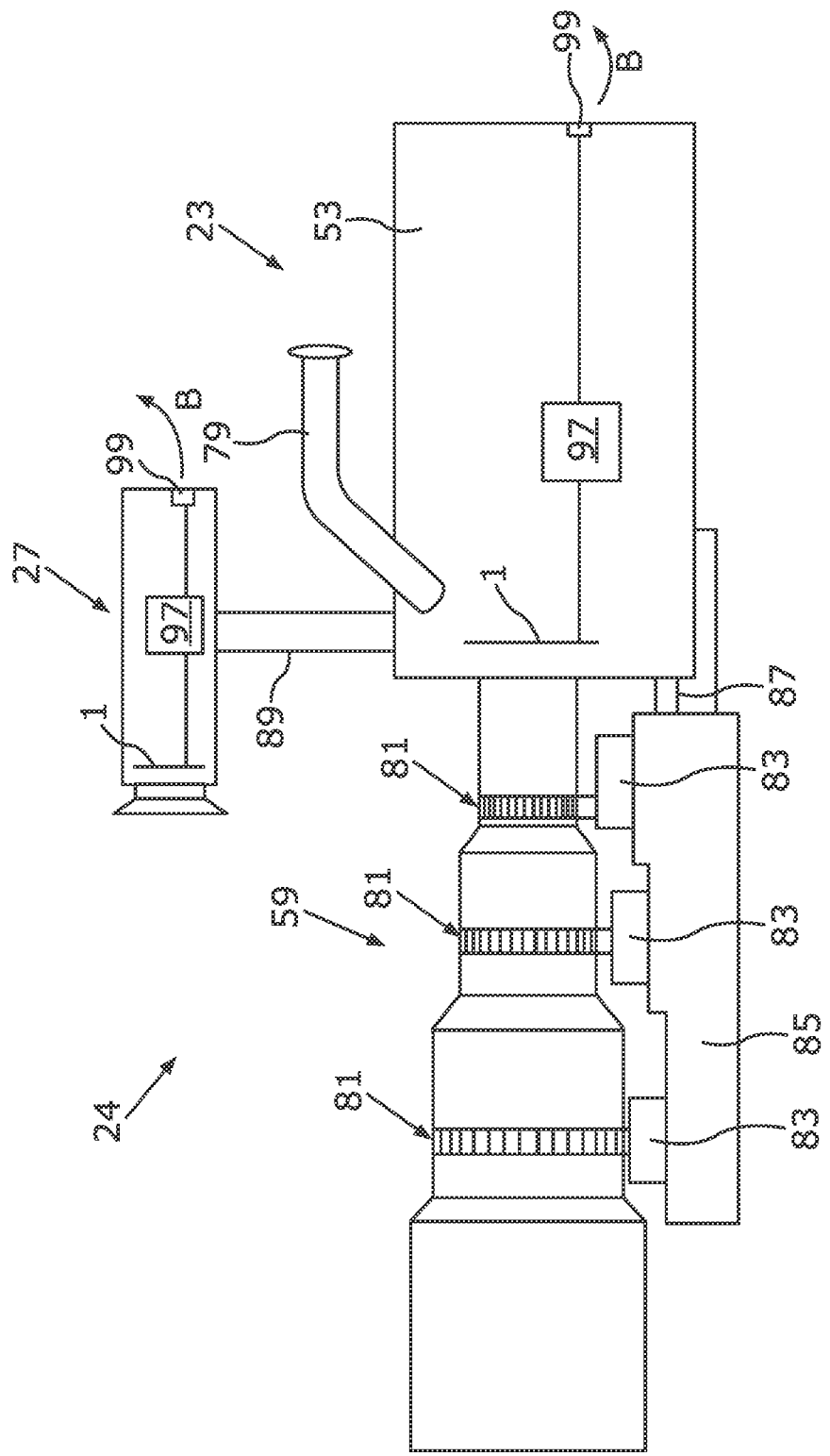

Figure 1:
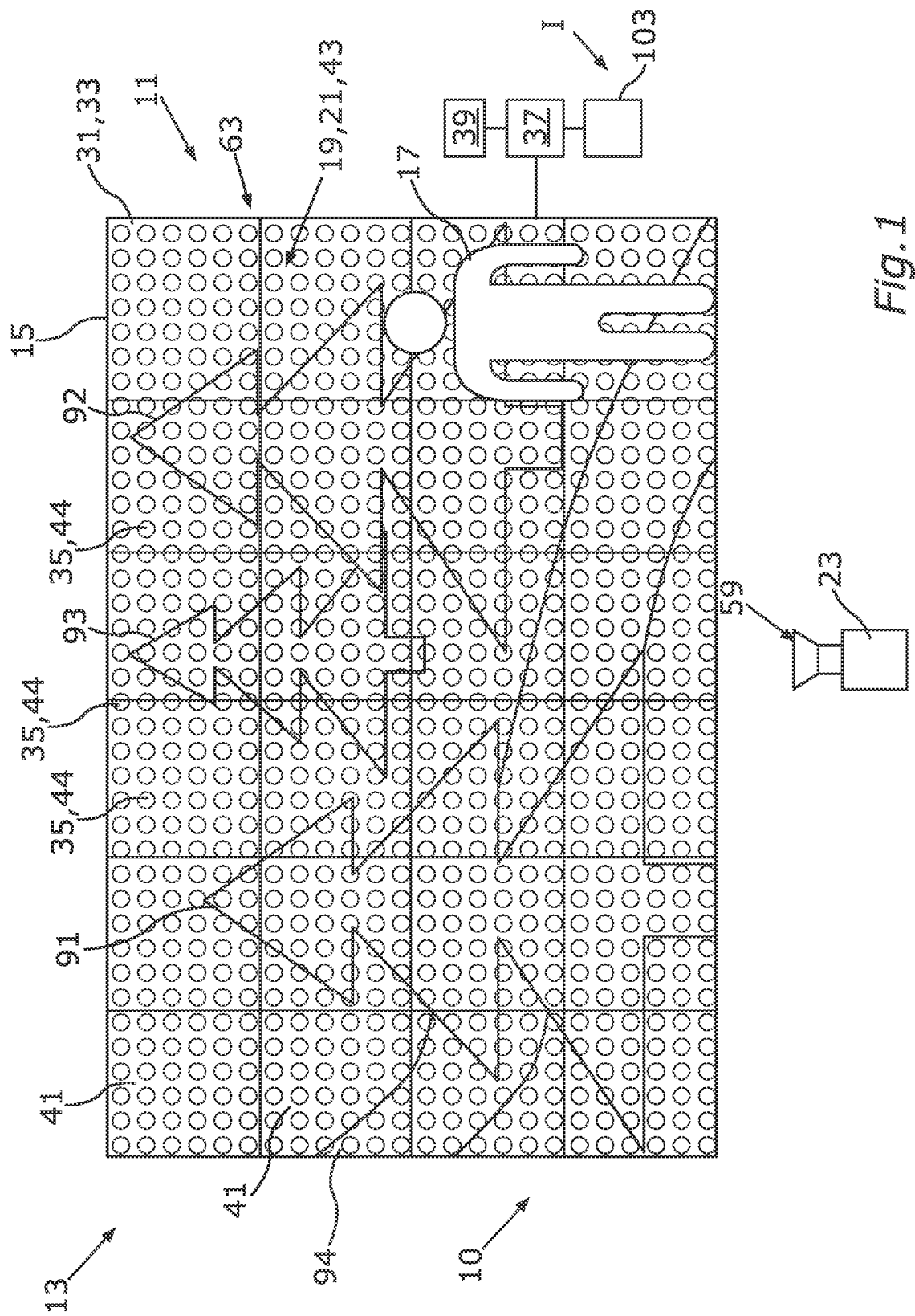

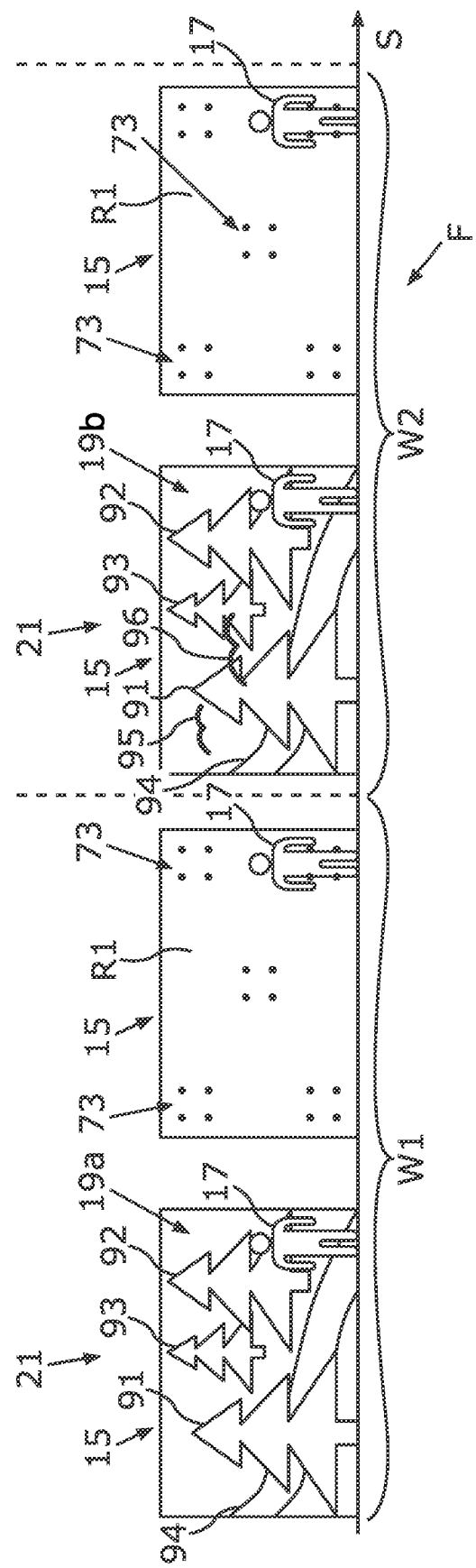
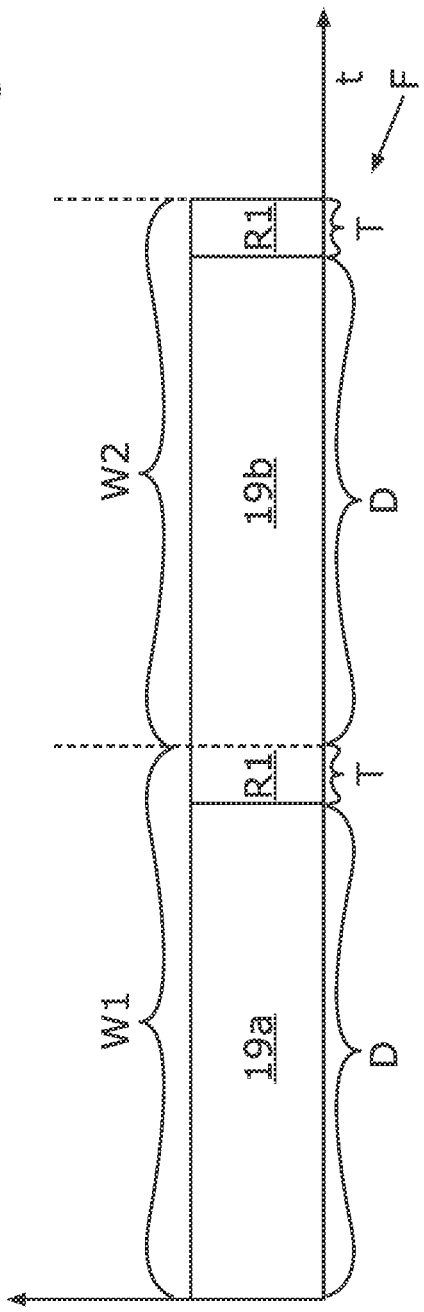

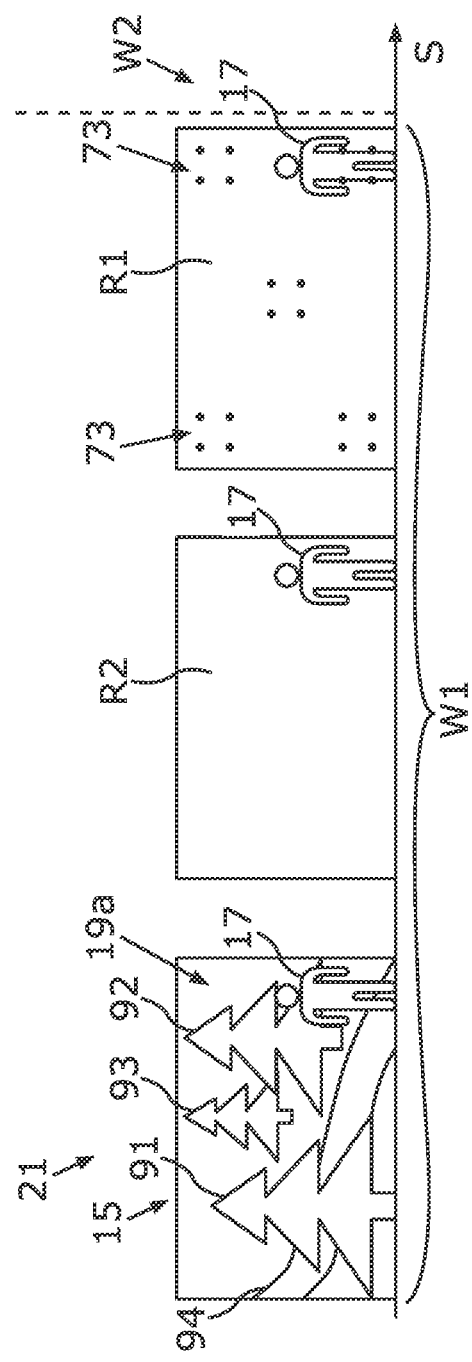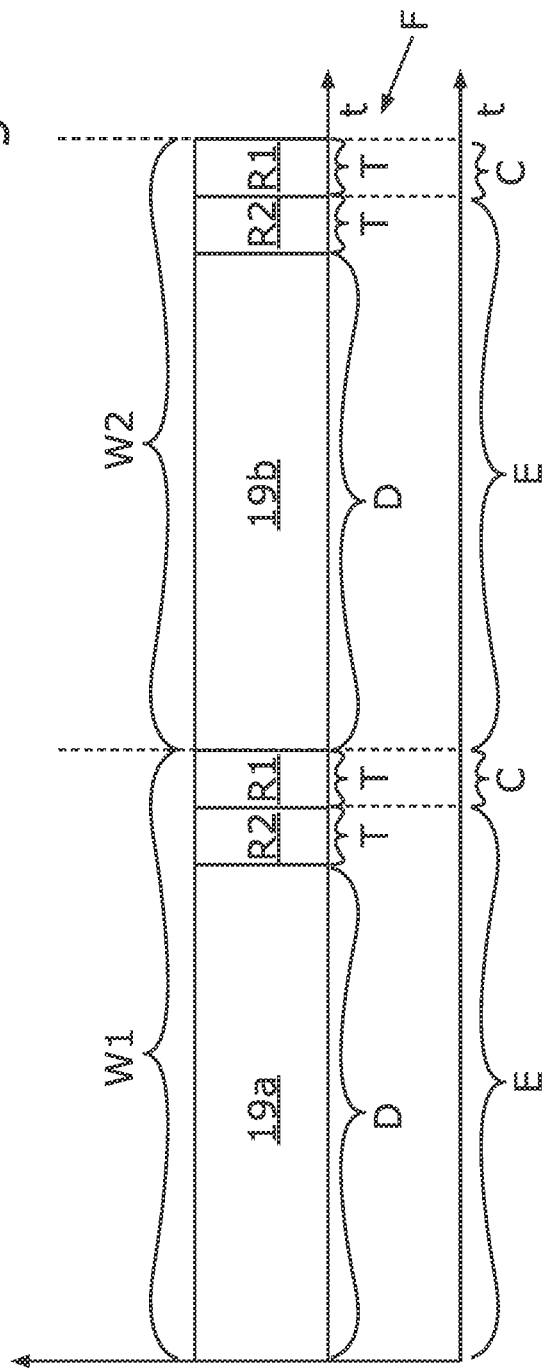

BACKGROUND DISPLAY DEVICE

BACKGROUND DISPLAY DEVICE

The invention relates to a background display device for a virtual image recording studio that is configured to display, behind a real subject, a representation of a virtual background for a recording by an associated camera.

Such background display devices can in particular be provided to display in an image recording studio a landscape or an environment in which a recording is to be made by an associated camera and which forms a virtual background for a scene to be recorded. The image recording studio, for example, can be a film studio for recording moving image sequences or a photo studio in which individual images or still images are recorded. In general, such a recording can include local storage of image data or a transmission to a remote location (e.g. Broadcast, Streaming). In the virtual image recording studio, a virtual background or a virtual environment can thus be created in which an actor can move around during a moving image recording, or it can form a background for a still image recording. The virtual background mentioned in the present context can thus represent a background subject whose representation can be directly recorded by an associated camera as an apparently real environment of a (foreground) scene. The representation of the virtual background "behind" a real subject is to be understood comprehensively in this context since the virtual environment can also be provided above or below the real subject.

For example, when recording moving images, a background display device can be used to display a representation of a virtual background to be able to record a scene directly in the intended environment. In particular, as a result of this, the acting can be facilitated since possible events occurring in the virtual background can be perceived by an actor and the actor can react to these events. In contrast to the use of a green screen for example where the environment is not visible to the actor, the actor can therefore adapt his acting to any background events and a director, a camera person or any other person involved in a shooting can already gain an overall impression of the scene during the shooting and can evaluate the scene. In addition, the entire scene or a corresponding section of a film can be viewed and checked directly after the recording, without the background provided for the scene also having to be superposed.

In the case of still image recordings, such a background display device can, for example, be used to record photographs in basically any surrounding in an image recording studio, and thus in a controllable environment, and to have the resulting image fully in view while taking the photograph. The background and the real subject or a person to be photographed can thus be optimally matched or coordinated with one another. In addition, the recorded photo can be viewed immediately, in order to carry out necessary adjustments if required.

To display the representation of the virtual background, background display devices can in particular form or have an electronic display, which has an active pixel matrix, and can, for example, comprise an active illumination apparatus having a plurality of light-emitting elements. For example, to display a representation of a virtual background in a virtual image recording studio, an LED wall can be used whose light-emitting diodes can be controllable individually and/or in groups of adjacent light-emitting diodes or in arrays of light-emitting diodes. Light-emitting diodes of such an LED wall can, for example, be provided as LEDs (Light Emitting Diodes) or as OLEDs (Organic Light Emitting Diodes).

Furthermore, the light-emitting diodes can be part of a liquid crystal display. Such background display devices can, for example, extend over a width of at least 5 m and a height of at least 2 m to be able to record several actors in front of a common (virtual) background.

Furthermore, background display devices can comprise a plurality of panels at which the picture elements are arranged and which together form the LED wall. While the panels can be substantially two-dimensional and the picture elements arranged at a panel can extend in a two-dimensional arrangement, it can, for example, be achieved by a suitable arrangement of a plurality of panels that the background display device is sectionally curved and/or arched. The background display device can thereby be arranged, for example, both behind and above or below the real subject in the virtual image recording studio in order also to enable the direct recording of a representation of a virtual sky, or of a virtual ceiling of a room, or of a virtual floor in the image recording studio. Alternatively to an LED wall, a representation of a virtual background can generally also be generated by light spots that are produced by a reflection or a transmission at a light source wall, for example, a screen for a rear projection. For this purpose, the active light generation can take place by a projector, wherein the light sources are merely formed indirectly on the screen.

Such a background display device can in particular make it possible to visually present a virtual background, which can in particular represent a three-dimensional scene, by appropriately controlling the picture elements and/or to adapt said virtual background by changing the control during a recording. A background display device thus offers the possibility of representing a virtual background for a scene to be recorded in an animated and easily adaptable manner and thereby, in particular, of facilitating the acting or the gestures.

In addition to displaying a representation of a virtual background, provision can be made with such background display devices to also display static images on the background display device between the display of the possibly time-varying representation of the virtual background. Such static images can, for example, be cyclically displayed on the background display device in order, for example in addition to the representation of the virtual background, also to be able to create a green screen recording by the background display device at a certain point in time and to store it in an image data set. Furthermore, provision can, for example, be made to cyclically switch the background display device completely light or completely dark to be able to generate an alpha ($\alpha$-) channel in an image generated by the camera in the virtual image recording studio.

For example, with regard to the control of such a background display device, provision can be made that the virtual background is generated by a 3D computer that transmits the virtual background and/or the representations of the virtual background to be displayed to further control units of the background display device. Furthermore, the 3D computer can be provided to transmit a static image, instead of a representation of the virtual background, at specific and/or fixed points in time, for example periodically, so that the static image can be displayed on the background display device. However, such a control can have a comparatively computation-intensive and complex design since the static images have to be added in a temporally exact and high-frequency manner to the respective representations of the virtual background to be transmitted, and in particular have to be transmitted over the entire data path starting from the 3D computer up to the display on the background display device.

It is therefore an object of the invention to provide a background display device that enables a simplified display of such static images.

This object is satisfied by a background display device having the features of claim 1.

The background display device has at least one panel, which has a plurality of actively illuminating picture elements in an at least two-dimensional arrangement, and a control circuit, wherein the control circuit is configured to control the picture elements to alternately display at least a part of the representation of the virtual background and to display a reference image that does not represent the virtual background. Furthermore, the control circuit has a reference image memory in which the reference image can be stored.

The representation of the virtual background can in particular have an image content that can, for example, change dynamically in dependence on the scene recorded in the virtual image recording studio. An associated image content control device can in particular be provided for this purpose that is configured to transmit dynamically changing representations of the virtual background to the background display device, as will be explained in more detail below. Due to such a time-variable representation of the virtual background, movements in the virtual background or background events playing out in the virtual background can, for example, be shown directly in the virtual image recording studio so that an actor can, for example, react to such background events in the virtual background and can adapt the acting accordingly. Furthermore, the background events can be imaged directly by the camera.

The control circuit of the background display device disclosed herein is provided to control the picture elements to display the representation of the virtual background on the background display device. The control circuit can in particular be configured to control the picture elements in dependence on received image information with respect to the representation of the virtual background—in particular image information generated by the image content control device already mentioned above—to display the representation on the background display device by the picture elements. However, in addition to controlling the picture elements to display the representation of the virtual background, the control circuit is configured to control the picture elements to display the reference image. In this regard, the representation of the virtual background or the reference image can be displayed on the background display device in dependence on the control of the picture elements by the control circuit.

The reference image can, for example, also be referred to as a static image, wherein, in particular in consecutive display cycles, the content of the reference image cannot change or can change in accordance with a predetermined repetition scheme. For example, provision can be made that a changed representation of the virtual background is imaged in two consecutive images generated by the associated camera by changing the representation of the virtual background between the images. In contrast, the reference image can, however, always remain unchanged so that, for example, consecutive images of the reference image displayed on the background display device can be identical—at least in the region of the image in which the reference image and/or the background display device is/are imaged.

Since the reference image can be stored in the reference image memory of the control circuit, the reference image can so-to-say be kept available in the reference image memory in order not first to have to be transmitted to the control circuit directly before a display. The reference image memory can therefore also be referred to as a shadow register in which a reference image to be displayed at a later point in time is already available for a display while the representation of the virtual background is still being displayed on the background display device, for example. It is thus in particular not necessary that an image content control device or a 3D computer for generating the virtual background also cyclically transmits the reference image to the control circuit to enable a display of the reference image on the background display device. Rather, the control circuit can access the reference image memory directly and, for example, at fixed points in time to read out the reference image or the corresponding image information and to display it/them on the background display device. The control of the background display device can thereby in particular be simplified and accelerated in that transmission times for transmitting the reference image from an image content control device and/or a 3D computer can be saved. Furthermore, in particular in the case of a high repetition frequency of the display of the reference image, the amount of data to be transmitted can also be reduced in a possibly relevant manner.

The background display device, which has a control circuit for controlling the picture elements comprising a reference image memory for storing a reference image, thus makes it possible in a simple manner to cyclically display the reference image or, if applicable, a plurality of reference images on the background display device without these reference images having to be transmitted in a complex manner over a long transmission path. Such reference images can in particular be used to obtain additional information with respect to the recording in the virtual image recording studio and/or the image of the representation of the virtual background generated by the camera in that, for example, the display of a reference image can enable a recording in front of a green screen, the generation of an alpha ($\alpha$) channel for the image and/or a determination of the position of the camera, as will be explained in more detail below.

Further embodiments can be seen from the dependent claims, from the description and from the drawings.

In some embodiments, the background display device can be configured as an LED wall and the picture elements can be configured as light-emitting diodes or light-emitting diode units. The light-emitting diodes of such an LED wall can, for example, be configured as LEDs (Light Emitting Diodes) or as organic light-emitting diodes or OLEDs (Organic Light Emitting Diodes). Furthermore, in the case of an LED wall, provision can be made that the individual picture elements, which together generate the representation of the virtual background, are formed by individual light-emitting diodes. However, the individual picture elements can also be formed by respective light-emitting diode units, wherein each light-emitting diode unit can in particular comprise a plurality of light-emitting diodes, in particular three light-emitting diodes. For example, a light-emitting diode unit can also comprise three, four or more light-emitting diodes, wherein the plurality of light-emitting diodes of a light-emitting diode unit can in particular have different emission spectra and can optionally be equipped with a color mixer. Furthermore, in such a light-emitting diode unit, provision can be made that the individual light-emitting diodes of the light-emitting diode unit can be selectively controlled to produce a desired color of the picture element formed by the light-emitting diode unit. A light-emitting diode unit can in particular comprise a light-emitting diode emitting red light, a light-emitting diode emitting green light, and a light-emitting diode emitting blue light.

In some embodiments, provision can further be made that the picture elements can be individually controlled to generate the representation of the virtual background. By controlling the picture elements, a respective color and/or brightness of the picture element can in particular be settable to be able to set a section or a point of the representation of the virtual background that is displayed by the respective picture element to the intended color and/or brightness.

In some embodiments, the background display device can extend in a vertical and/or horizontal orientation, in particular with continuous or quasi-continuous transitions. For example, provision can be made that the background display device extends in a vertical orientation in a planar manner behind the real subject to display the representation of the virtual background behind the real subject.

Alternatively or additionally, provision can, however, also be made that the background display device at least sectionally extends in a horizontal orientation so that the representation of the virtual background can also be displayed above the real subject, for example. Furthermore, the background display device can be configured to surround and to cover the real subject in order to enable as complete as possible a display of the virtual background over a large angular range. In a section in which the background display device transitions from a vertical orientation into a horizontal orientation, the background display device can also be arched and/or curved. In particular in an assembly of the background display device from a plurality of panels, the panels can be assembled to form different and, for example, vault-like geometries in order to provide a desired environment for a recording in the virtual image recording studio. Furthermore, in some embodiments, provision can be made that the background display device is sectionally arranged on a floor of the virtual image recording studio. In such sections, the background display device can also in particular extend in a horizontal orientation.

In some embodiments, the background display device can further be configured to illuminate the real subject. This background display device can in particular serve to illuminate the real subject in addition to other illumination of the virtual image recording studio. For example, it can thereby be achieved that the real subject casts a shadow to be expected when illumination sources, for example a street lamp, are included in the virtual background in that the illumination of the real subject to be expected from a real street lamp starts from the displayed representation of the street lamp of the virtual background. However, the background display device can also be configured to sectionally emit light for illuminating a scene and can so-to-say act as a spotlight, while the background display device can display the representation of the virtual background at other sections.

In some embodiments, the background display device can be configured to vary the representation of the virtual background in time during the recording. Events taking place in the virtual background can thereby in particular be displayed directly by the background display device during a camera recording so that, unlike, for example, in the case of a green screen recording, an actor can react to these events and can correspondingly adapt the acting thereto. Consequently, the background display device can in particular be configured to display a film sequence, which can be recorded directly by the camera, during the camera recording. A subsequent superposition of the recording of the camera with a provided background is thus no longer necessary.

Furthermore, in some embodiments, the background display device can extend over a width of at least 5 m and a height of at least 2 m. The background display device can thereby in particular have a sufficient size to be able to record several actors in front of a common (virtual) background. Furthermore, such a sufficient size of the background display device can, for example, make it possible to position various real objects, such as furniture and/or seating, in the virtual image recording studio and, for example, to record a film scene involving these real objects and/or with moving actors in front of the representation of the virtual background. The representation of the virtual background and/or the background display device can in particular extend beyond a section imaged by the camera during a typical recording in the virtual image recording studio, for example a recording of a scene performed by actors, so that the representation of the virtual background can, for example, extend in the image generated by the camera up to all the edges of the image and is not limited to an inner section of the image.

In some embodiments, the virtual background can represent a three-dimensional scene. For example, the virtual background can be a landscape or a room in which a scene to be recorded in the virtual image recording studio is set. The representation of the virtual background displayed on the background display device and/or a section of the representation of the virtual background displayed at the at least one panel can in particular correspond to a projection of the three-dimensional scene or of a section of the three-dimensional scene onto the two-dimensional arrangement of the picture elements.

In some embodiments, the control circuit can be configured to individually control all the picture elements of the at least one panel. Alternatively thereto, the picture elements of the at least one panel can be divided into a plurality of groups of picture elements, wherein the control circuit can be configured to individually control the picture elements of one of the plurality of groups.

For example, the control circuit can be configured as a panel control (also referred to as a panel controller) and can be configured to individually control all the picture elements of the at least one panel. For this purpose, the control circuit can, for example, be directly connected to all the picture elements of the at least one panel in order to directly control the picture elements. However, provision can also be made that a respective picture element control device, in particular an LED driver, is associated with each of the picture elements or respective groups of picture elements, wherein the control circuit can be configured to control the picture elements indirectly by controlling the respective associated picture element control devices. Furthermore, such picture element control devices can in particular be configured as driver chips to be able to control a plurality of picture elements.

As an alternative to a configuration of the control circuit as a panel control, provision can, however, also be made that the control circuit is configured to individually control the picture elements of a respective one of a plurality of groups of picture elements. In this regard, the control circuit can, if necessary, itself be configured as a picture element control device and/or as a driver chip and/or as an LED driver that can be controlled by a panel control or a panel controller.

Thus, provision can, for example, be made that the background display device has a panel control or a panel controller comprising a reference image memory in which the reference image can be stored. The panel control can, for example, be controllable by a central control of the background display device that can be configured to transmit a respective section of a projection of the virtual background onto the background display device to the respective panel controls of one or more panels. This can in particular be provided when the background display device comprises a plurality of assembled panels, wherein a respective panel control is associated with each of the panels.

Alternatively thereto, provision can, however, also be made that the background display device has a picture element control device that is formed with a reference image memory. The reference image memory can thus in particular be directly associated with a picture element control device that directly transmits the image information to be displayed, without interposition of a further control device, to the respective picture elements. In a configuration of a picture element control device with a reference image memory, it can in particular be achieved that the reference image ultimately does not have to be transmitted at all before a display or at most has to be transmitted over a minimal path in that the reference image can be provided at the picture element control devices directly controlling the picture elements.

The reference image memory can in particular be associated with the at least one panel so that the reference image does not first have to be transmitted to the at least one panel and/or distributed and transmitted to individual panels by a central control of the background display device and/or a 3D computer for generating the virtual background.

In some embodiments, the reference image can comprise at least one pattern. For example, the reference image can comprise a geometric pattern. The display of such a reference image can, for example, make it possible to use the reference image as a tracking image in order to determine a position of the associated camera in the virtual image recording studio. For this purpose, provision can, for example, be made that the associated camera provided for the imaging of the representation of the virtual background itself images the reference image so that, by identifying the patterns in the image generated by the camera and by determining a location of the patterns in the image, the position of the camera relative to the panel and/or to the background display device can be determined. For this purpose, a position of the patterns displayed on the background display device with respect to the virtual image recording studio can in particular be determined and/or known so that the position of the camera can be inferred by determining the locations of the patterns in the image that can change in dependence on the position and/or the orientation of the camera. For this purpose, the background display device can, for example, have a position-determining device that is configured to evaluate the image generated by the camera in order to determine the locations of the patterns in the image and the position of the camera in the virtual image recording studio. For such a position determination, the image can, for example, be transmittable from the camera to an interface of the background display device. The background display device can in particular be configured to generate and/or to display the virtual background and/or the representation of the virtual background in dependence on the position of the camera.

Alternatively thereto, provision can, however, also be made that an auxiliary camera is connected to the associated camera and is configured to image the reference image and the patterns included therein so that the position of the auxiliary camera can be determined based on the location of the patterns in the image generated by the auxiliary camera and, in particular in the case of a defined position difference between the auxiliary camera and the associated camera, the position of the camera can also be determined based on this location. This can in particular enable a determination of the position of the associated camera without the patterns, for example, having to be superposed on the image of the representation of the virtual background and/or having to be subsequently removed. The image of such an auxiliary camera can also be transmittable to the background display device.

Furthermore, in some embodiments, the reference image can only be unicolored, in particular green, blue, white or black. In some embodiments, the reference image can also only be two-colored, in particular black and white. A two-color reference image can in particular form a checkerboard-like pattern.

The display of such unicolored reference images can, for example, make it possible when using a background display device to also, for example, generate a green screen image in addition to images of the representation of the virtual background so that the virtual background can subsequently be exchanged, replaced or supplemented in the image, if necessary. Furthermore, provision can be made to generate an alpha ($\alpha$) channel in an image of the background display device generated by the associated camera by displaying a light or dark unicolored reference image, i.e. in particular by displaying white light at all the picture elements or by switching off all the picture elements or by stopping a light emission of all the picture elements. Such an alpha ($\alpha$) channel can, if necessary, also be generated by a defined black and white pattern displayed on the background display device so that such a pattern can, for example, also be used as a reference image.

Furthermore, the control circuit can be configured to control the picture elements to display a time-varying representation of the virtual background.

In some embodiments, the control circuit can be configured to refresh the representation of the virtual background at a predefined or predefinable refresh rate. Such a refresh rate can, for example, also be referred to as a frame rate of the background display device. Furthermore, the refresh rate can be synchronized with an image recording rate of the associated camera so that the refresh rate of the background display device and the image recording rate of the camera can, for example, be matched to one another prior to a recording in the virtual image recording studio. Due to such a synchronization, it can be achieved that a respective representation of the virtual background is associated with each image generated by the camera and, for example, movements can be imaged in the virtual background distributed in a defined manner to a plurality of images.

In some embodiments, the control circuit can be configured, for the display of a transition from a first representation of the virtual background to a second representation of the virtual background, to control the picture elements to display the first representation in a first display window and to control the picture elements to display the second representation in a subsequent second display window. It is generally also possible that the representation of the virtual background remains unchanged in consecutive display windows so that the first representation and the second representation can also correspond to one another in certain recording situations. In general, provision can, however, be made that the background display device is configured to display time-variable representations of the virtual background so that different representations of the virtual background can be displayed in different display windows.

The first display window and the second display window can have a corresponding display duration. The display duration can in particular correspond to a reciprocal of the refresh rate already mentioned so that in particular the representation of the virtual background can also be refreshed at the refresh rate and displayed in respective display windows.

Furthermore, in some embodiments, the control circuit can be connected to a background image memory into which the second representation can be written during the first display window and/or in which the second representation is stored during the first display window. In general, the background image memory and the reference image memory can be formed by separate physical units, for example respective non-volatile memories and/or semiconductor memories, or the reference image memory and the background image memory can be formed by a common physical unit, for example a common non-volatile memory and/or semiconductor memory, wherein the reference image and the second representation can, for example, be stored and/or storable at respective defined memory locations of such a common unit.

Since the second representation can already be written into such a background image memory during the first display window, the second representation can also be provided directly at the start of the second display window and does not first have to be transmitted to the control circuit at a point in time at which the display is to take place. Rather, due to such a prior storage of the second representation in the background image memory, which can likewise be referred to as a shadow register, the control of the background display device can be accelerated and the second representation can be displayed directly at the start of the second display window. Accordingly, further representations to be displayed after the second display window can also be written into the background image memory during a respective display window preceding the display so that the respective representation stored in the background image memory can in particular be able to be refreshed and/or changed.

In some embodiments, the control circuit can be configured to control the picture elements during the first display window both to display the first representation of the virtual background and to display the reference image.

Provision can thus be made that the control circuit is configured to display the reference image in a display window originally associated with the display of the first representation, i.e. that no separate display window having a display duration that corresponds to the reciprocal of a refresh rate of the background display device is available for the display of the reference image. Rather, the reference image can only be briefly displayed in a first display window associated with the first representation in order, for example, to be able to generate an alpha (α-) channel in an image of the representation of the virtual background or of the image recording studio generated by the associated camera.

In some embodiments, the control circuit can further be configured to control the picture elements during the first display window first to display the first representation and then to display the reference image, or vice versa. In this regard, the reference image can, for example, not be displayed at the center of the display window, while the first representation is displayed before the display of the reference image and after the display of the first representation. Rather, the display of the reference image can be clearly separated in time from the display of the first representation and can, for example, take place at the end of the display window when the imaging of the representation of the virtual background by the associated camera has, for example, already been completed.

In some embodiments, the control circuit can be configured to control the picture elements during the first display window to display the first representation for a representation duration and to display the reference image for an image display duration, wherein the representation duration is greater than the image display duration or corresponds to the image display duration. For example, the representation duration can be greater than two times, greater than three times, greater than four times, greater than five times, greater than six times, greater than seven times, greater than eight times and/or greater than nine times the image display duration.

Thus, in some embodiments, the reference image can be shown and/or displayed within the display window only for a short image display duration, in particular a short image display duration relative to the display window, wherein, during the display window, mainly the representation of the virtual background can be displayed for a recording by the associated camera. For example, provision can be made that 80% of the display window is used for the display of the representation of the virtual background and 20% is used for the display of the reference image and/or for the display of a plurality of reference images. A ratio of 90% to 10% can also be provided, for example.

Short image display durations can further in particular be provided when the associated camera has a rolling lens shutter or a rolling shutter in which the actual exposure window goes beyond the exposure time of a respective region and/or of a respective row of an image sensor so that, in such a camera, light can be detected during a large part of the display window. However, provision can be made to display the reference image, for example comprising a geometric pattern, outside the exposure window of the camera so that the reference image does not interfere with the image generated by the associated camera, but can be imaged by an auxiliary camera, for example. Short image display durations can therefore also enable such a display of the reference image outside an exposure window in cameras having rolling lens shutters.

In some embodiments, the background display device can have an interface for receiving information about an exposure window of the associated camera, wherein the control circuit can be configured to control the picture elements outside the exposure window of the associated camera to display the reference image.

The control circuit can in particular be configured to display a reference image, which comprises a geometric pattern for determining a position of the associated camera, outside the exposure time of the associated camera provided for the recording. As already explained, on a display outside the exposure window of the associated camera, the reference image can also, for example, be imaged by an auxiliary camera connected to the associated camera to enable a determination of the position of the associated camera. This position determination can thus take place using the reference image without the reference image being imaged by the associated camera and being able to interfere with the imaging of the representation of the virtual background, for example. However, provision can generally also be made to image such tracking images—reference images comprising geometric patterns—by the associated camera and thus to display the reference image on the background display device within an exposure window of the camera, wherein clearly defined geometric patterns can in particular enable a simple subsequent removal during a post-production from the images generated by the camera. The interface of the background display device can serve as a synchronization input for this purpose.

In some embodiments, the control circuit can in particular also be configured to receive a control command (in particular a trigger signal) as information about the exposure window from the associated camera via the interface of the background display device and to control the picture elements to display the reference image in response to the control command or the trigger signal. The camera can in particular transmit such a control command or such a trigger signal when an exposure pause—i.e. a time between two consecutive exposures—of the camera begins so that the reference image can be displayed outside the exposure window of the associated camera in response to the control command. Since the control of the background display device with regard to the display of the reference image can thus so-to-say be initiated by the associated camera, it can in particular be achieved in a simple manner that the reference image is displayed outside the exposure window of the camera and/or during an exposure pause in order to, for instance, enable a recording of the reference image by an auxiliary camera but not impair the image created by the camera for recording the representation of the virtual background by the display of the reference image.

An exposure window and an exposure pause typically take place alternately in a camera so that information about an exposure window (point in time and/or duration) indirectly also includes information about an exposure pause (point in time and/or duration), and vice versa.

In this regard, the invention also relates to a recording system comprising a background display device of the kind disclosed herein and an associated camera, wherein the control circuit is configured to receive a control command for displaying the reference image via an interface of the background display device and to control the picture elements to display the reference image in response to the control command. The control command can in particular be a trigger signal that is implemented accordingly by the control circuit.

In some embodiments of the recording system, in order to transmit the control command, the camera can likewise comprise an interface that is configured to communicate with the interface of the background display device. Wireless and/or wired communication can be provided between the interface of the camera and the interface of the background display device.

In some embodiments, the camera can be configured to transmit the control command to the interface of the background display device in dependence on an exposure pause of the camera, in particular during or at the start of an exposure pause. It can thereby in particular be achieved that the reference image, in response to the control command, is likewise displayed in the exposure pause. Alternatively thereto, in some embodiments, the control circuit can be configured to control the picture elements to display the reference image in response to the control command with a predefined delay time. It can thereby, for example, be achieved that the reference image can be reliably displayed in an exposure pause in response to a control command transmitted by the camera at the end of an exposure.

In some embodiments, the control circuit can further be connected to a further reference image memory in which a further reference image is stored, wherein the control circuit can be configured to control the picture elements during the first display window to display the first representation of the virtual background, to display the reference image and to display the further reference image. For example, provision can be made to display a first reference image, which enables the generation of an alpha ($\alpha$) channel in the image of the representation of the virtual background generated by the associated camera, and to display a second reference image, which comprises a pattern or a plurality of patterns to enable a determination of the position of the associated camera in the image recording studio, during the first display window in addition to displaying the representation of the virtual background.

Furthermore, provision can be made that the control circuit is configured to control the picture elements during the first display window to display the first representation for a representation duration and to display the further reference image for a further image display duration, wherein the representation duration can be greater than the further image display duration. The further reference image can thus also be displayed, in particular only briefly displayed, in the first display window, wherein the large part of the first display window can be used to display the representation of the virtual background. The control circuit can further be configured to control the picture elements during the first display window to display the reference image and to display the further reference image for an identical duration. The further image display duration can thus in particular correspond to the image display duration already mentioned. For example, provision can be made that the representation duration corresponds to 80% of the display window, while the image display duration and the further image display duration can each correspond to 10% of the display window.

In some embodiments, the control circuit can furthermore be configured to control the picture elements during the second display window both to display the second representation of the virtual background and to display the reference image. If necessary, a further reference image can also be displayed during the second display window. The reference image and/or the reference images can in this regard be displayed in all the frames or display windows in which representations of the virtual background are displayed on the background display device so that an alpha ($\alpha$) channel can, for example, be generated for each image generated by the camera by displaying a corresponding reference image during the associated display window.

In some embodiments, the background display device can have an image content control device, wherein the image content control device can be configured to generate the virtual background, to determine a projection of the virtual background onto the two-dimensional arrangement of the picture elements and to transmit the determined projection to the control circuit.

The image content control device can in particular be configured to determine respective background image data that represent the projection of the virtual background onto the two-dimensional arrangement of the picture elements. The image content control device can furthermore in particular be configured to generate the virtual background as a three-dimensional virtual background so that a projection of this three-dimensional virtual background onto the two-dimensional arrangement of the picture elements can be required to be able to display the representation of the virtual background on the background display device by the picture elements. To generate the virtual background, the image content control device can, for example, be connected to a memory in which a model of the virtual background is stored.

Since an image content control device can be provided that is configured to generate the virtual background and to determine a projection of the virtual background in order to transmit this projection to the control circuit, the control circuit itself can in particular not be configured to fulfill these functions. For example, the generation of the virtual background can be performed by a 3D computer that can transmit the virtual background to a central control of the background display device. This central control device can then, for example, determine the projection of the virtual background onto the two-dimensional arrangement of the picture elements in order to forward the corresponding background image data to respective panel controls. These panel controls, which can be associated with a respective panel of the background display device, can in particular form the control circuit, or the control circuit can be formed by respective picture element control devices controlled by the panel controls. In this regard, the representation of the virtual background can indeed be transmittable to the control circuit, wherein, in embodiments with such an image content control device, the control circuit is, however, not configured to generate the representation of the virtual background and/or the virtual background. Conversely, the reference image memory is thus not associated with the image content control device so that the reference image, unlike the projection of the virtual background onto the two-dimensional arrangement of picture elements, does not first have to be transmitted to the control circuit.

In some embodiments, the image content control device can be configured to write changing representations of the virtual background into a background image memory connected to the control circuit. This background image memory can in particular be the background image memory already mentioned above. Due to such a writing of changing representations, it can in particular be achieved that a respective representation of the virtual background to be displayed in a subsequent display window can already be written into the background image memory during a previous display window in order to be directly available for the display in the subsequent display window. A possible delay due to a still required data transmission of the representation to be displayed from the image content control device to the control circuit can thereby be avoided.

In some embodiments, the control circuit can have a data input via which the reference image can be transmitted to the control circuit while bypassing the image content control device. Thus, the reference image does not have to be transmitted over an entire data path from the image content control device to the control circuit to enable a display on the background display device. Furthermore, the reference image can thus already be generated before the recording by the associated camera and can be transmitted via the data input to the control circuit and held there. With this procedure, a transmission of the reference image to the control circuit therefore no longer has to take place during the recording, whereby the time requirement of the control circuit is additionally reduced.

In some embodiments, the control circuit can be configured to directly control the picture elements. Alternatively thereto, the control circuit can be connected to a plurality of picture element control devices, wherein each of the plurality of picture element control devices can be configured to control a respective group of picture elements. In such embodiments, the control circuit can further be configured to control the picture elements via the plurality of picture element control devices. As already explained, the control circuit can accordingly in particular form a panel control and/or a panel controller that controls the picture elements via the picture element control device. The picture element control devices can, for example, be configured as drivers and/or driver chips. Alternatively thereto, in some embodiments, the control circuit can also itself be configured as a driver chip and/or a driver to directly control the picture elements.

In some embodiments, the background display device can comprise a plurality of panels, wherein each of the plurality of panels can be formed as rectangular, in particular as square, and without edges. Furthermore, the plurality of panels can be arranged in an at least two-dimensional matrix.

The background display device can thus in particular be assembled from a plurality of panels, wherein a respective section of the representation of the virtual background and/or of the reference image can be displayed at each of the plurality of panels. Furthermore, at least one control circuit can be associated with each of the plurality of panels. In particular if the control circuit is configured as a panel control or a panel controller, exactly one separate control circuit can be associated with each of the plurality of panels. In the configuration of the control circuit as a picture element driver and/or a picture element driver chip, provision can, however, be made that a plurality of control circuits are associated with each of the plurality of panels to be able to control a plurality of groups of picture elements of the respective panel.

The invention further relates to a background display device for a virtual image recording studio that is configured to display, behind a real subject, a representation of a virtual background for a recording by an associated camera. The background display device has at least one panel, which has a plurality of actively illuminating picture elements in a two-dimensional arrangement, an image content control device and a control circuit. The image content control device is configured to generate the virtual background, to determine a projection of the virtual background onto the two-dimensional arrangement of the picture elements and to transmit the determined projection to the control circuit. The control circuit is configured to control the picture elements to alternately display at least a part of the representation of the virtual background and a reference image that does not represent the virtual background. The control circuit further has a data input via which the reference image can be transmitted to the control circuit while bypassing the image content control device.

Since the control circuit has a data input via which the reference image can be transmitted to the control circuit while bypassing the image content control device, it can again be achieved that the reference image does not first have to be transmitted over an entire data path from the image content control device to the control circuit to enable a display on the background display device. A corresponding computing capacity of the image content control device and/or a required transmission capacity for transmitting the reference image can accordingly be saved.

In some embodiments, the control circuit can have a reference image memory in which the reference image can be stored. The reference image memory can in particular be connected directly, or via the control circuit, to the data input of the control circuit so that the reference image can be written into the reference image memory via the data input.

The reference image memory thus makes it possible to keep the reference image available for the control circuit so that the control circuit can control the picture elements at a predefined point in time to display the reference image without first having to transmit the reference image.

In some embodiments, the background display device can have an interface for receiving information about an exposure window of the associated camera, wherein the control circuit can be configured to control the picture elements outside the exposure window of the associated camera to display the reference image. As already explained, the information can in particular also comprise a control command (in particular a trigger signal) of the associated camera, wherein the control circuit can be configured to control the picture elements to display the reference image in response to the control command and/or the trigger signal. For example, the camera can be configured to transmit such a control command or such a trigger signal to the interface when an exposure pause of the camera starts so that the reference image displayed in response to the control command or the trigger signal can be displayed outside the exposure window of the associated camera.

Furthermore, the explained features of the background display device, of the image content control device and of the control circuit can also be implemented in this further aspect of the invention, individually or in combination, to achieve the respective advantages explained.

The invention will be explained in the following purely by way of example with reference to embodiments and to the drawings.

Figure 2A:
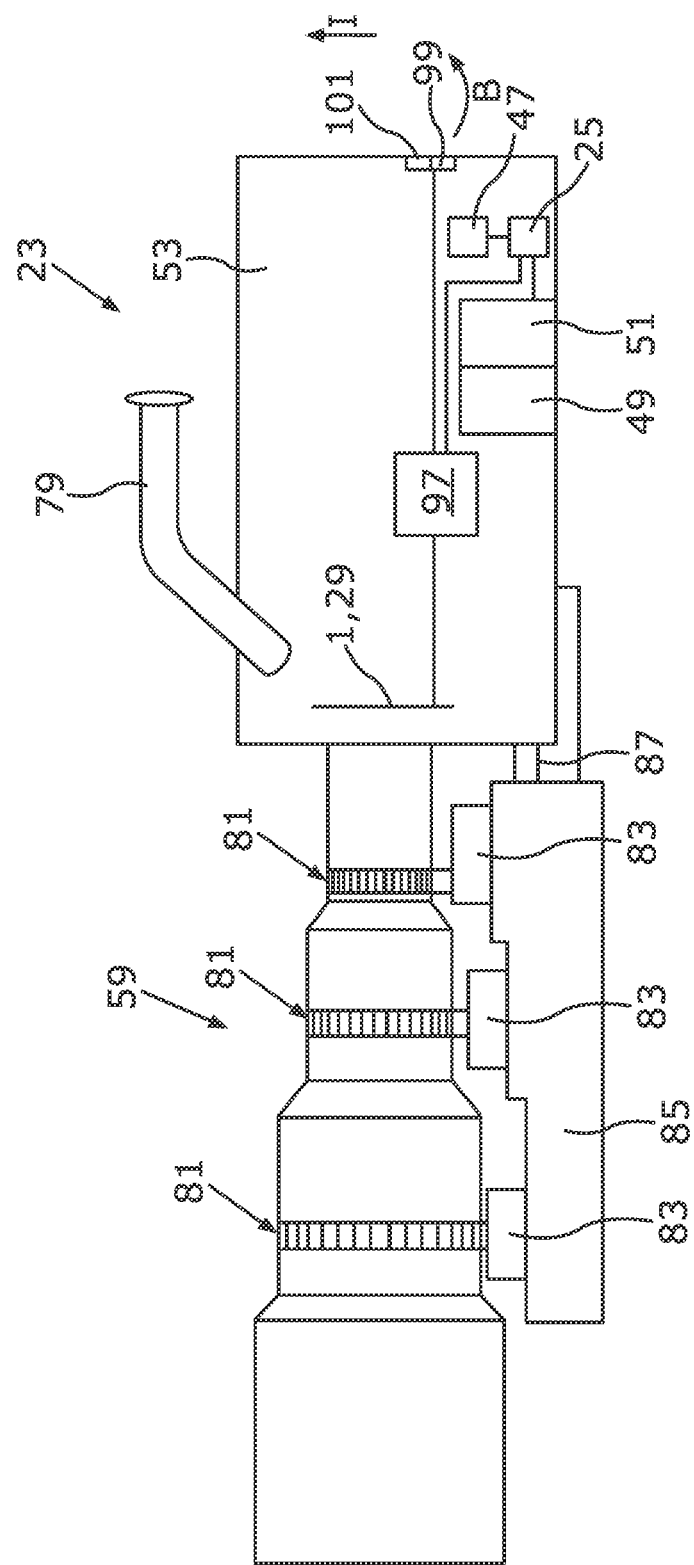
Figure 3:
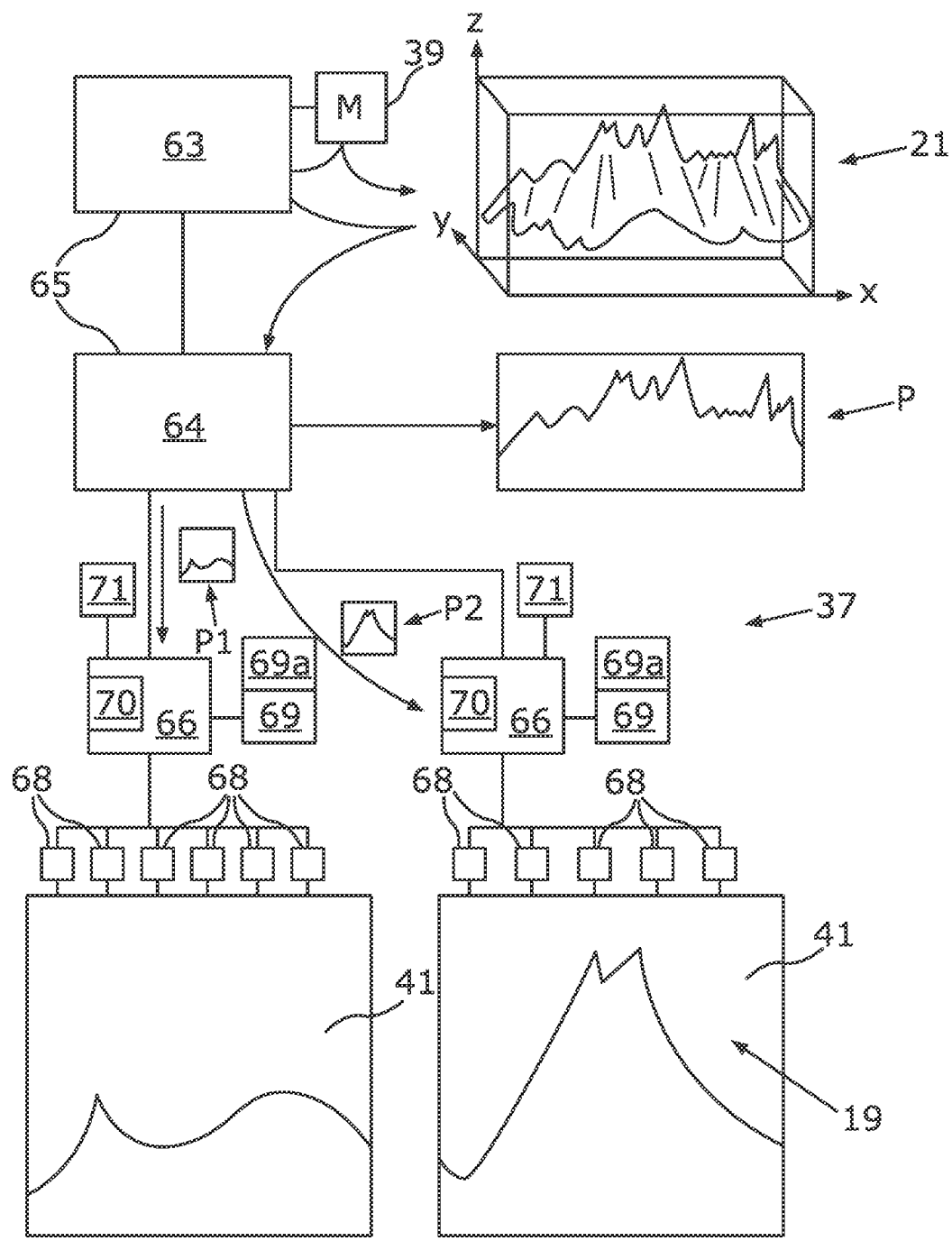

There are shown:

FIG. 1 a schematic representation of a recording system for an image recording studio with a background display device for displaying a representation of a virtual background and with a camera;

FIGS. 2A and 2B a schematic representation of a camera provided for a recording in the image recording studio and of a camera system with the camera and an auxiliary camera connected to the camera;

FIG. 3 a schematic representation of a control device of the background display device;

FIGS. 4A and 4B a schematic representation for illustrating an alternating display of the representation of the virtual background and of a reference image as well as a schematic representation for illustrating a time sequence of the display; and FIGS. 5A and 5B a schematic representation for illustrating an alternating display of the representation of the virtual background, of a first reference image and of a second reference image as well as a schematic representation for illustrating a time sequence of the display.

FIG. 1 schematically shows a virtual image recording studio 13, in which a scene, in particular in the form of a moving image recording and/or a photo recording, can be recorded by an associated camera 23. The camera 23 can, for example, be designed as a moving image camera in order to carry out moving images recordings that can be stored as a series of images generated by the camera 23. For this purpose, the camera 23 has a lens 59 that can in particular be designed as an interchangeable lens and that can selectively be connected to a housing of the camera 23. As a result, a respective lens 59, optimally adjusted to the environment in the image recording studio 13, can always be used in order to be able to generate the best possible recordings. An image sensor 1 comprising a plurality of light-sensitive sensor elements can in particular be arranged in the housing of the camera 23, onto which sensor elements light, which enters via a diaphragm aperture of a diaphragm, can be guided by a lens system or at least one lens to generate an image (cf. FIG. 2).

Furthermore, a background display system 11 having a background display device 15 is arranged in the image recording studio 13 and, together with the camera 23, forms a recording system 10. The background display device 15 comprises an active illumination apparatus 31 configured as an LED wall 33 and is configured to display a representation 19 of a virtual background 21 for a recording by the camera 23. For this purpose, the illumination apparatus 31 or the LED wall 33 has a plurality of actively illuminating picture elements 35 that are arranged next to one another in a two-dimensional arrangement. For example, the picture elements 35 can be configured as individually controllable light-emitting diodes 44 or as individually controllable light-emitting diode units, wherein each of such a light-emitting diode unit can comprise a plurality of light-emitting diodes 44, in particular three light-emitting diodes 44. Provision can in particular be made that the picture elements 35 are configured as light-emitting diode units having three respective light-emitting diodes 44, wherein one of the three light-emitting diodes 44 can emit red light, one light-emitting diode 44 can emit green light and one light-emitting diode 44 can emit blue light. The light-emitting diode unit can furthermore comprise a color mixer to be able to set a respective color and/or brightness emitted by the picture element 35 by a respective individual control of the light-emitting diodes 44 of a light-emitting diode unit. The light-emitting diodes 44 can, for example, be configured as LEDs or as organic light-emitting diodes 44 or OLEDs. Background display devices for displaying a representation of a virtual background that generate the representation by a rear projection can generally also be used in the image recording studio 13.

The background display device 15 further comprises a plurality of panels 41. A respective plurality of the actively illuminating picture elements 35 are arranged at each panel 41 of the plurality of panels 41 so that a section of the representation 19 of the virtual background 21 can be displayed at each of the panels 41. The panels 41 are in particular rectangular and/or square and formed without edges so that the representation 19 of the virtual background 21 can also be displayed without visible interruptions at the transitions between panels 41. The panels 41 are further arranged in a two-dimensional matrix to form the background display device 15. In this regard, the active illumination apparatus 31 comprises a plurality of panels 41 in the embodiment shown.

The representation 19 of the virtual background 21 reflects here, for example, a three-dimensional scene 43 with objects 91, 92, 93 and 94, three trees and a path, which can be generated by appropriate control of the picture elements 35, in particular, by an appropriate setting of their respective color and brightness. The three-dimensional scene 43 is projected onto the essentially two-dimensional arrangement of the picture elements 35 of the illumination apparatus 31, wherein, in particular, the objects 91, 92 and 93 appear at a different distance to the illumination apparatus 31 or the background display device 11, in order to recreate the three-dimensionality of a real background corresponding to the virtual background 21.

In particular, the representation 19 of the virtual background 21 by way of the background display device 15, serves to generate a background for a recording of a real subject 17, for example an actor, in front of which a recording can be made or a film scene can be played. As a result, basically any kind of landscapes, spaces or environments can be created in the image recording studio 13, in front of, or, in which, a scene, for example, for a movie, is to be filmed. It is furthermore possible, by a time-variable control of the picture elements 35, to show movements in the virtual background 21, for example, a passing car, to which the actor 17 can react in an easy and improved manner compared to a scene in front of a green screen.

The background display device 15 extends here essentially in the vertical direction so that the actor 17 can move in front of the virtual background 21. However, in order to be able to depict the virtual background 21 more extensively, the background display device 15 can also extend around or above the actor 17, wherein the background display device 15 above the actor 17 can exhibit, in particular, a horizontal orientation. In order to be able to surround the actor 17 or to generate a transition from the shown vertical orientation to a horizontal orientation, the background display device 15 or the illumination apparatus 31 or the LED wall 33 can also be at least sectionally arched or curved.

In addition to representing the virtual background 21, the background display device 15 can also serve to illuminate the real subject 17 and thereby facilitate, for example, a further studio lighting for the image recording studio 13. Furthermore, by illuminating the real subject 17 by the background display device 15, the interaction of the real subject 17 or the actor 17 with light sources present in the virtual background 21, for example, lanterns or lamps, can be improved in that the real subject 17 casts a shadow which corresponds to the light conditions visible in an image generated by the camera 23.

To be able to generate the representation 19 of the virtual background 21 and to control the picture elements 35 to display the representation, the background display device 15 has a control device 37 that is connected to a memory 39. A model M of the virtual background 21 can in particular be stored in the memory 39 so that the control device can generate the virtual background 21 based on the model. Furthermore, the control device 37 can be configured to project the virtual background 21 onto the background display device 15 and in particular the two-dimensional arrangement of the picture elements 35 (cf. also FIG. 3).

A possible embodiment of the associated camera is schematically shown in FIG. 2. The camera 23 has a camera body 53 to which a lens 59 is fastened. The lens 59 can in particular be configured as an interchangeable lens so that selectively various configured lenses 59 can be connected to the camera body 53 and a lens 59 that is optimal for a respective recording can always be selected. The lens 59 has three lens rings 81 by which the respective parameters of the lens 59 can be set. For example, a focusing distance, a focal length, a zoom factor and/or a diaphragm aperture, in particular an aperture of an iris diaphragm, can be set or adapted by rotating a respective one of the lens rings 81. The camera 23 can in particular be configured as a motion picture camera or moving image camera to be able to consecutively generate a sequence of images 73 that can, for example, be played as a film.

To be able to adjust the lens rings 81, a lens ring drive unit 85 is connected to the camera body 53 via a holding rod 87 and comprises a respective lens setting motor 83 for each of the lens rings 81. The lens rings 81 can be rotated by these lens setting motors 83 and adjustments to the lens 59 can be made as a result. In particular, the lens ring drive unit 85 can be actuated remotely so that said lens parameters can be set or changed remotely.

At the camera body 53, a further display device 49 is arranged via which information about settings of the camera 23 can be displayed to a user. The display device 49 can in particular be a display. The camera 23 furthermore has an input device 51 which is arranged at the camera body 53 and via which the user can make settings of the camera 23. An exposure time of the camera 23 can in particular be settable at the input device 51, wherein a control device 25 connected to the input device 51 can be configured to control the camera 23 in accordance with the input exposure time. The display device 49 and the input device 51 can in particular be formed by a touch screen via which both information can be displayed to the user and user inputs can be received.

In order to generate an image of incident light through the lens 59, the camera 23 further comprises an image sensor 1 arranged within the camera body 53. This image sensor 1 can be configured based on, for example, CMOS technology or CCD technology and comprise a plurality of light-sensitive sensor elements that can be arranged in a plurality of rows and columns. Furthermore, the camera 23 has a readout circuit 97 that is configured to read out, process and digitize the signals of the respective sensor elements and to output them to or via a signal output 99. For this purpose, the readout circuit 97 can in particular comprise amplifiers, multiplexers, analog-digital converters, buffer memories and/or microcontrollers. Ultimately, an image data set B can thus be generated by the camera 23, which corresponds to the image or an image of a field of view of the camera 23, and the image data set B can be output via the signal output 99. In order to check the field of view of the camera 23 and to be able to align the camera 23 onto a respective image section, a viewfinder 79, through which a cameraman can look through, is also arranged on the camera body 53. Furthermore, the control device 25 is connected to a memory 47 and can, for example, be configured to selectively write the image data set B into the memory 47 or to output it via the signal output 99.

Furthermore, the background display device 15 has an interface 103 and the camera 23 has an interface 101 via which information I can in particular be transmittable from the camera 23 to the background display device 15. The control device 37 of the background display device 15 can in particular be configured to control the active illumination apparatus 31 in dependence on information I received from the camera 23, as explained in more detail below.

In FIG. 2B, a camera system 24 is furthermore illustrated that, in addition to the associated camera 23 by which the representation 19 of the virtual background 21 is imaged during a recording, has an auxiliary camera 27 that is or can be connected to the main camera 23 via a coupling rod 89. In this respect, the auxiliary camera 27 is arranged in a defined position relative to the camera 23 and is oriented such that respective fields of view of the camera 23 and the auxiliary camera 27 substantially correspond to one another. The auxiliary camera 27 also has an image sensor 1 and a readout circuit 97 to generate an image data set B and to output it at a signal output 99 that represents an image generated by the auxiliary camera 27. Such a camera system 24 can in particular make it possible to determine a position of the associated camera 23 in the image recording studio 13 by recording a corresponding reference image R1 by the auxiliary camera 27. This will be explained in more detail below.

FIG. 3 shows a schematic illustration of the control device 37 of the background display device 15. The control device 37 comprises a 3D computer 63 that is connected to the memory 39. A model M of the virtual background 21 can, for example, be stored in the memory 39 and the 3D computer can be configured to generate the virtual background 21 based on the model M. For example, the virtual background 21 shown in FIG. 3 is formed by a three-dimensional mountainous landscape so that the 3D computer 63 can generate a virtual background 21 defined in a three-dimensional coordinate system x, y and z.

Thereupon, in the control device 37 illustrated by means of FIG. 3, provision is made that the 3D computer 63 transmits the generated virtual background 21 to a central control 64 of the background display device 15. The central control 64 (e.g. a microprocessor or a central processing unit, CPU) can in particular be configured to receive the virtual background 21 or data representing the virtual background 21 from the 3D computer 63, to read out and to process the data in order to determine a projection P of the virtual background 21 onto the active illumination apparatus 31 and/or the two-dimensional arrangement of the picture elements 25 on the basis of the received virtual background 21. The central control 64 can thus in particular determine image data that represent the projection P of the virtual background 21 onto the active illumination apparatus 31.

The 3D computer 63 and the central control 64 together form an image content control device 65 that ultimately in particular comprises the functions of generating the virtual background 21 and projecting the generated virtual background 21 onto the active illumination apparatus 31 and/or the background display device 15. Provision can generally also be made that, for example, the central control 64 is configured to generate the virtual background 21 based on the model M so that the image content control device 65 can also be formed by a single unit and does not necessarily have to be formed from the mutually separate units of the 3D computer 63 and the central control 64. Conversely, the 3D computer 63 can also, for example, be configured to determine the projection P and to take over the function of the central control 64 in this regard.

As already explained, the background display device 15 can in particular comprise a plurality of panels 41 at which a respective plurality of picture elements 35, which can in particular be configured as light-emitting diodes 44 or light-emitting diode units, are arranged in a two-dimensional arrangement. The control device 37 illustrated by means of FIG. 3 comprises, for each of these panels 41, a respective control circuit 66 (e.g. a microcontroller, a microprocessor or a central processing unit, CPU) that can also be referred to as a panel controller. The (panel) control circuits 66 are formed separately from the image content control device 65 (and thus from the 3D computer 63 and the central control 64), i.e. as separate physical units. The central control 64, as part of the image content control device 65 of the background display device 15, is further configured to determine respective sections P1 and P2 of the projection P of the virtual background 21 to be displayed at individual panels 41 and to transmit them to the respective control circuits 66 of the panels 41. The control circuits 66 can again be connected to respective picture element control devices 68, wherein each of the picture element control devices 68 can be configured to control a respective picture element 35 or a group of picture elements 35 of the associated panel 41. Via the picture element control devices 68, respective image information, for example a brightness and/or a color, of a pixel of the projection P to be displayed by a respective picture element 35 can in particular be transmitted to the picture elements 35 to be able to control the picture elements 35 of a panel 41 to display the respective section P1 or P2 of the projection P. Due to the joining together of the individual panels 41, the entire representation 19 of the virtual background 21 can thereby ultimately be displayed on the background display device 15 (cf. also FIG. 1).

As FIG. 3 further shows, the control circuits 66, which are configured as panel controls in the embodiment shown and are associated with a respective panel 41, are connected to a respective reference image memory 69 in which a reference image R1 or R2 can be stored (cf. also FIGS. 4A and 5A). The reference image memories 69 associated with the (panel) control circuits 66 are formed separately from the memory 39 associated with the image content control device 65, i.e. as separate physical units. The reference images R1, R2 can be transmitted to the control circuits 66 via a respective data input 70. The storing of the reference images R1, R2 in the respective reference image memory 69 enables the control circuit 66 to control the picture elements 35—via the picture element control devices 68—to alternately display the respective section P1 or P2 of the projection P of the virtual background 21 and the reference image R1 and/or R2. This is schematically illustrated by means of FIGS. 4A and 5B.

As FIG. 4A shows, the panel control circuits 66 can be configured, for the display of a transition from a first representation 19a of the virtual background 21 to a second representation 19b of the virtual background 21, to display the first representation 19a in a first display window W1 and to control the picture elements 35 in a subsequent display window W2 to display the second representation 19b. The background display device can be configured to change the representation 19 of the virtual background 21 at a predefined and/or settable refresh rate F in order, for example, to be able to show movements in the virtual background 21. The refresh rate F can in particular be coupled to an image recording rate of the associated camera 23 so that a respective representation 19a or 19b can be associated with each image of the representation 19 of the virtual background 21 created by the camera 23. In the second representation 19b of the virtual background 21, two further objects 95 and 96, two birds, are added by way of example so that a viewer of the images of the representations 19a and 19b created by the camera 23, and in particular of a corresponding moving image sequence, gains the impression that the birds 95 and 96 appear in the virtual background 21 behind the real subject 17 or the actor.

While the control circuits 66 are thus configured to display a respective representation 19a and 19b of the virtual background 21 in a respective display window W1 and W2, the control circuits 66 are further configured to show or to display the reference image R1 both in the display window W1 and in the display window W2 following the display of the representation 19a or 19b in time. With respect to the recording S taking place in the image recording studio 13, the representation 19 of the virtual background 21 and the representation 19 of the reference image R1 are thus displayed in an alternating manner, wherein the control circuits 66 can control the picture elements 35 accordingly via the picture element control units 68.

The reference image R1 shown in FIG. 4A has, by way of example, patterns 73 at a plurality of positions, said patterns 73 being able to be imaged by the associated camera 23, for example. This can make it possible to infer the position of the camera 23 in the virtual image recording studio 13 based on the locations of the patterns 73 in an image of the background display device 15 generated by the camera 23, wherein the absolute positions of the patterns 73 at the background display device 15, and thus in the virtual image recording studio 13, can in particular be known for this purpose. The reference image R1 can therefore make it possible to obtain additional information for and/or about the recording, which additional information can, for example, be transmitted to the 3D computer 63 and/or to the central control 64 of the background display device 15, so that in particular the 3D computer 63 can consider the position of the camera 23 when generating the virtual background 21. For this purpose, the 3D computer 63 can in particular make use of a game engine to generate the virtual background 21 in dependence on the position of the camera 23 in the virtual image recording studio 13—similarly to as in a computer game in dependence on the position of a player.

For this purpose, different databases can, for example, be stored with models M in the memory 39 to enable the generation of the virtual background 21 in dependence on the position of the camera 23.

As FIG. 4B illustrates, the first representation 19a and the second representation 19b can be displayed in the respective display window W1 or W2 for a corresponding representation duration D, while the reference image R1 can be displayed in the display windows W1 and W2 for a corresponding image display duration T. The representation duration D is greater than the image display duration T, wherein the image display duration T here by way of example corresponds to one tenth of a duration of the display window W1 or W2. The duration of the display windows W1 and W2 can in particular correspond to the reciprocal of the refresh rate F of the background display device 15. Provision can, for example, also be made to select a representation duration D of 80% of the display window W1 and W2 and an image display duration T of 20% of the display window W1 or W2. The reference image R1 can thus in particular only be briefly displayed in the display windows W1 and W2, while the larger part of the duration of the display windows W1 and W2 can be available for the display of the respective representation 19a or 19b of the virtual background 21.

Since the reference image R1 can be stored and/or is stored in the reference image memory 69, the (panel) control circuit 66 can receive the reference image R1 via the data input 70 while bypassing the image content control device 65, i.e. in particular the 3D computer 63 and the central control 64 of the background display device 15, in order to display said reference image R1 in the display windows W1 and W2. In particular, the reference image R1 thus does not, like the respective sections P1 and P2 of the projection P of the virtual background 21 onto the active illumination apparatus 31 or the background display device 15, ultimately have to be transmitted over the entire data path from the 3D computer 63 via the central control 64 to the control circuits 66, but is directly available in the reference image memory 69 for a cyclic display. The control of the background display device 15 can thereby in particular be accelerated and the amount of data to be transmitted from the image content control device 65 can be reduced by not having to transmit the reference image R1.

Furthermore, FIG. 3 shows that the control circuits 66 are connected to a respective background image memory 71. The background image memories 71 associated with the (panel) control circuits 66 are formed separately from the memory 39 associated with the image content control device 65, i.e. as separate physical units. Provision can be made that the respective sections P1 and P2 of the second representation 19b of the virtual background 21 can be written into the background image memories 71 by the image content control device 65 during the first display window W1 and/or while the first representation 19a is being displayed in the first display window W1. It can thereby be achieved that the second representation 19b is already available to the control circuits 66 in the background image memory 71 at the start of the second display window W2 so that the control circuits 66 can call up the second representation 19b or the respective sections P1 and P2 of the second representation 19b and can appropriately control the picture elements 35 of the associated panel 41 without a transmission of the sections P1 and P2 starting from the 3D computer 63 being necessary beforehand.

Furthermore, a respective second reference image memory 69a, in which a second reference image R2 can be stored, is connected to the control circuits 66. The reference image memories 69 and 69a can in particular be formed by a common physical unit, for example a common semiconductor memory, so that the reference image memories 69 and 69a can, for instance, write to different memory locations at this physical unit. However, provision can also be made that physical units that are separate from one another, for example two semiconductor memories, are connected to the control circuit 66 as reference image memories 69 and 69a.

Since the control circuits 66 are connected to two reference image memories 69 and 69a, both a respective representation 19 of the virtual background 21 and two reference images R1 and R2 can in particular be displayed in an alternating manner in the display windows W1 and W2 and in subsequent display windows not shown in the Figures. In FIG. 5A, this is shown by way of example for the display window W1.

In turn, the first representation 19a of the virtual background 21 is first displayed, whereupon the control circuit 66 controls the picture elements 35 of the respective associated panel 41 to display the second reference image R2. The second reference image R2 is unicolored and can, for example, be green, blue, white or black. The display of a green or blue reference image R2, in which in particular all the picture elements 35 can be controlled to display the same color, can make it possible, for example, to also create a green screen recording or a blue screen recording in addition to the image of the representation 19a to be able to replace and/or process the virtual background 21 in post-production, if necessary. By displaying an all-white or all-black reference image R2, an alpha ($\alpha$-) channel can further, for example, be generated for the image of the background display device generated by the camera 23. Such an alpha ($\alpha$-) channel can, for example, also be generated in that the second reference image R2 is shown in black and white and, for example, with a checkerboard-like pattern.

After the display of the second reference image R2, the control circuits 66 can be configured to display the first reference image R1 comprising the patterns 73 on the background display device 15 by appropriately controlling the picture elements 35 in order to enable a position determination of the camera 23 in the virtual image recording studio 13. In the subsequent display window W2, the order can be repeated accordingly so that the control circuits 66 can be configured to control the picture elements 35 to alternately display the representation 19 of the virtual background 21, the reference image R2 and the reference image R1 during a recording S. In general, the display of even further reference images can also be provided in the display window W1, and in particular in all the display windows, during a recording S.

FIG. 5B again illustrates the time sequence over the time t in the display windows W1 and W2. The representations 19a and 19b can again be displayed in the display windows W1 and W2 for a representation duration D that is greater than an image display duration T with which the reference images R2 and R1 are displayed in the display windows W1 and W2. For example, the representation duration D can correspond to 80% of the respective display window W1 or W2, while the image display duration T for each of the reference images R2 and R1 can take up 10% of the display window W1 or W2.

Furthermore, it is illustrated in the lower section of FIG. 5B that provision can be made that the reference image R1 is displayed in an exposure pause C of the associated camera 23. The associated camera 23 can be configured to generate images at an image recording rate that can in particular correspond to the refresh rate F of the background display device 15. During such an image recording, an exposure E can first take place (in accordance with an exposure window of the camera 23), wherein consecutive exposures E of the camera 23 can be separated from one another by a respective exposure pause C. An exposure E (i.e. an exposure window) and an exposure pause C can in particular take place in an alternating manner. Provision can be made that the respective representation 19a or 19b and the reference image R2 are displayed on the background display device 15 during an exposure E of the camera 23 so that the respective images generated by the camera 23 can include both the representation 19a or 19b and the second reference image R2 to be able to generate an alpha (α-) channel, for example. The first reference image R1 comprising the patterns 73 can, in contrast, be displayed in a respective exposure pause C so that the image generated by the camera 23 is not disturbed by the patterns 73. This can in particular be provided when the camera system 24 illustrated by means of FIG. 2B comprising the auxiliary camera 27 is used in the virtual image recording studio 13 so that the reference image R1 and the patterns 73 included therein can be imaged by the auxiliary camera 27 to enable a determination of the position of the camera 23. In contrast, the image generated by the camera 23, which is, for example, to be used as part of a moving image sequence, can be generated without interference by the patterns 73. For this purpose, the camera 23 can transmit information I about the exposure window E, in particular via the interfaces 101 and 103, to the background display device 15. This information I can, for example, also comprise a control command in the form of a trigger signal of the associated camera 23 and the control circuit 66 can be configured to control the picture elements 35 directly to display the reference image R1 in response to the control command or the trigger signal of the associated camera 23. For example, the camera 23 can be configured to transmit such a control command or such a trigger signal in a temporal relation with the exposure pauses C to the interface 103 of the background display device 15 so that it can be achieved in a simple manner that the reference image R1 is displayed during the exposure pauses C and thus outside the exposures E.

While the control circuits 66 are configured as panel controls in the embodiment illustrated by means of the Figures, provision can also be made that the control circuits 66 are configured as picture element control devices 68. In such embodiments, the picture element control devices 68 can consequently be connected to a reference image memory 69 and/or a further reference image memory 69a so that the reference images R1 and R2 can also be directly available at the picture element control devices 68.

REFERENCE NUMERAL LIST 1 image sensor
10 recording system
11 background display system
13 image recording studio
15 background display device
17 real subject, actor
19 representation
19a first representation
19b second representation
21 virtual background
23 camera
24 camera system
27 auxiliary camera
31 illumination apparatus
33 LED wall
35 picture element
37 control device
39 memory
41 panel
43 three-dimensional scene
35 light-emitting diode
49 display device
51 input device
53 camera body
59 camera lens, interchangeable lens
63 3D computer
64 central control
65 image content control device
66 control circuit
68 picture element control device
69 reference image memory
69a further reference image memory
70 data input
71 background image memory
73 pattern
79 viewfinder
81 lens ring
83 lens setting motor
85 lens ring drive unit
89 coupling rod
87 holding rod
91 first object
92 second object
93 third object
94 fourth object
95 fifth object
96 sixth object
97 readout circuit
99 signal output
101 interface
103 interface
B image data set
C exposure pause
D representation duration
E exposure window
F frame rate
I information
M model
P projection
P1 section of the projection
P2 section of the projection
R1 reference image
R2 reference image
S recording
T image display duration
W1 first display window
W2 second display window
x coordinate
y coordinate z coordinate

The invention claimed is:

1. A background display device for a virtual image recording studio that is configured to display, behind a real subject, a representation of a virtual background for a recording by an associated camera,
  wherein the background display device has at least one panel, which has a plurality of actively illuminating picture elements in an at least two-dimensional arrangement, and a control circuit,
  wherein the control circuit is configured to control the picture elements to alternately display at least a part of the representation of the virtual background and a reference image that does not represent the virtual background,
  wherein the control circuit has a reference image memory in which the reference image can be stored,
  wherein the control circuit is configured, for the display of a transition from a first representation of the virtual background to a second representation of the virtual background, to control the picture elements to display the first representation in a first display window and to control the picture elements to display the second representation in a subsequent second display window, and
  wherein the control circuit is configured to control the picture elements during the first display window to display the first representation for a representation duration and to display the reference image for an image display duration, wherein the representation duration is greater than the image display duration or corresponds to the image display duration.

2. The background display device in accordance with claim 1,
  wherein the background display device has an interface for receiving information about an exposure window of the associated camera, wherein the control circuit is configured to control the picture elements outside the exposure window of the associated camera to display the reference image.

3. The background display device in accordance with claim 1,
  wherein the background display device has an image content control device, wherein the image content control device is configured to generate the virtual background, to determine a projection of the virtual background onto the two-dimensional arrangement of the picture elements and to transmit the determined projection to the control circuit.

4. The background display device in accordance with claim 3,
  wherein the control circuit has a data input via which the reference image can be transmitted to the control circuit while bypassing the image content control device.

5. A recording system comprising the background display device in accordance with claim 1 and an associated camera, wherein the control circuit of the background display device is configured to receive a control command for displaying the reference image via an interface of the background display device and to control the picture elements to display the reference image in response to the control command.

6. The recording system in accordance with claim 5, wherein the camera is configured to transmit the control command to the interface of the background display device in dependence on an exposure pause of the camera.

7. A background display device for a virtual image recording studio that is configured to display, behind a real subject, a representation of a virtual background for a recording by an associated camera,
  wherein the background display device has at least one panel, which has a plurality of actively illuminating picture elements in a two-dimensional arrangement, an image content control device and a control circuit,
  wherein the image content control device is configured to generate the virtual background, to determine a projection of the virtual background onto the two-dimensional arrangement of the picture elements and to transmit the determined projection to the control circuit,
  wherein the control circuit is configured to control the picture elements to alternately display at least a part of the representation of the virtual background and a reference image that does not represent the virtual background,
  wherein the control circuit has a data input via which the reference image can be transmitted to the control circuit while bypassing the image content control device.

8. The background display device in accordance with claim 7,
  wherein the background display device is configured as an LED wall, and wherein the picture elements are configured as light-emitting diodes or as light-emitting diode units.

9. The background display device in accordance with claim 7,
  wherein the reference image comprises at least one pattern.

10. The background display device in accordance with claim 7,
  wherein the reference image is unicolored or two-colored.

11. The background display device in accordance with claim 7,
  wherein the control circuit is configured, for the display of a transition from a first representation of the virtual background to a second representation of the virtual background, to control the picture elements to display the first representation in a first display window and to control the picture elements to display the second representation in a subsequent second display window.

12. The background display device in accordance with claim 11,
  wherein the control circuit is connected to a background image memory into which the second representation can be written during the first display window or in which the second representation is stored during the first display window.

13. The background display device in accordance with claim 11,
  wherein the control circuit is configured to control the picture elements during the first display window both to display the first representation of the virtual background and to display the reference image.

14. The background display device in accordance with claim 11,
  wherein the control circuit is configured to control the picture elements during the first display window first to display the first representation and then to display the reference image, or vice versa.

15. The background display device in accordance with claim 11,
  wherein the control circuit is configured to control the picture elements during the first display window to display the first representation for a representation duration and to display the reference image for an image display duration, wherein the representation duration is greater than the image display duration or corresponds to the image display duration.

16. The background display device in accordance with claim 11,
wherein the control circuit is connected to a further reference image memory in which a further reference image is stored, wherein the control circuit is configured to control the picture elements during the first display window to display the first representation of the virtual background, to display the reference image and to display the further reference image.

17. The background display device in accordance with claim 7,
wherein the image content control device is configured to write changing representations of the virtual background into a background image memory connected to the control circuit.

18. The background display device in accordance with claim 7,
wherein the control circuit has a reference image memory in which the reference image can be stored.

19. The background display device in accordance with claim 7,
wherein the background display device has an interface for receiving information about an exposure window of the associated camera, wherein the control circuit is configured to control the picture elements outside the exposure window of the associated camera to display the reference image.

20. A recording system comprising the background display device in accordance with claim 7 and an associated camera, wherein the control circuit of the background display device is configured to receive a control command for displaying the reference image via an interface of the background display device and to control the picture elements to display the reference image in response to the control command.

21. A background display device for a virtual image recording studio that is configured to display, behind a real subject, a representation of a virtual background for a recording by an associated camera,
wherein the background display device has at least one panel, which has a plurality of actively illuminating picture elements in an at least two-dimensional arrangement, and a control circuit,
wherein the control circuit is configured to control the picture elements to alternately display at least a part of the representation of the virtual background and a reference image that does not represent the virtual background,
wherein the control circuit has a reference image memory in which the reference image can be stored,
wherein the control circuit is configured, for the display of a transition from a first representation of the virtual background to a second representation of the virtual background, to control the picture elements to display the first representation in a first display window and to control the picture elements to display the second representation in a subsequent second display window, and wherein the background display device has an interface for receiving information about an exposure window of the associated camera, wherein the control circuit is configured to control the picture elements outside the exposure window of the associated camera to display the reference image.

22. A background display device for a virtual image recording studio that is configured to display, behind a real subject, a representation of a virtual background for a recording by an associated camera,
wherein the background display device has at least one panel, which has a plurality of actively illuminating picture elements in an at least two-dimensional arrangement, and a control circuit,
wherein the control circuit is configured to control the picture elements to alternately display at least a part of the representation of the virtual background and a reference image that does not represent the virtual background,
wherein the control circuit has a reference image memory in which the reference image can be stored,
wherein the background display device has an image content control device, wherein the image content control device is configured to generate the virtual background, to determine a projection of the virtual background onto the two-dimensional arrangement of the picture elements and to transmit the determined projection to the control circuit, and
wherein the image content control device is configured to write changing representations of the virtual background into a background image memory connected to the control circuit.

23. A recording system comprising:
background display device for a virtual image recording studio; and
a camera,
wherein the background display device is configured to display, behind a real subject, a representation of a virtual background for a recording by the camera,
wherein the background display device has at least one panel, which has a plurality of actively illuminating picture elements in an at least two-dimensional arrangement, and a control circuit,
wherein the control circuit is configured to control the picture elements to alternately display at least a part of the representation of the virtual background and a reference image that does not represent the virtual background,
wherein the control circuit has a reference image memory in which the reference image can be stored,
wherein the control circuit of the background display device is configured to receive a control command for displaying the reference image via an interface of the background display device and to control the picture elements to display the reference image in response to the control command, and
wherein the camera is configured to transmit the control command to the interface of the background display device in dependence on an exposure pause of the camera.

* * * * *